United States Patent [19]

Nakayama et al.

[11] Patent Number: 5,360,306
[45] Date of Patent: Nov. 1, 1994

[54] DELIVERING APPARATUS USING PARALLEL CONVEYOR SYSTEM AND SHIPPING APPARATUS EMPLOYED BY THE DELIVERING APPARATUS

[75] Inventors: Susumu Nakayama; Hiroyuki Nakayama, both of Ishikawa, Japan

[73] Assignee: Kabushiki Kaisha Nakayama Egg, Ishikawa, Japan

[21] Appl. No.: 91,224

[22] Filed: Jul. 13, 1993

[51] Int. Cl.$^5$ .............................................. B65G 67/24
[52] U.S. Cl. .................................. 414/331; 198/419.1; 198/419.2; 198/429
[58] Field of Search ........................ 414/331, 395, 396; 198/429, 419.1, 419.2

[56] References Cited

U.S. PATENT DOCUMENTS

| | | | |
|---|---|---|---|
| 2,661,100 | 12/1953 | Ashford | 414/331 |
| 2,990,934 | 7/1961 | Flynn | 198/419.1 X |
| 4,141,442 | 2/1979 | Cole et al. | 198/429 |
| 4,360,098 | 11/1982 | Nordstrom | 198/419.2 X |
| 4,442,932 | 4/1984 | Sashiki et al. | 198/429 X |
| 4,621,969 | 11/1986 | Berghäll et al. | 414/331 |
| 4,991,708 | 2/1991 | Francioni | 198/419.2 |
| 5,097,939 | 3/1992 | Shanklin et al. | 198/419.1 |
| 5,181,820 | 1/1993 | Sjogren et al. | 414/331 |

FOREIGN PATENT DOCUMENTS

| | | | |
|---|---|---|---|
| 55008 | 3/1986 | Japan | 414/331 |
| 322731 | 4/1970 | Sweden | 414/331 |
| 2025884 | 1/1980 | United Kingdom | 198/419.2 |
| 2106070 | 4/1983 | United Kingdom | 414/331 |

*Primary Examiner*—David A. Bucci
*Attorney, Agent, or Firm*—Flynn, Thiel, Boutell & Tanis

[57] ABSTRACT

A delivering apparatus using parallel conveyor system for detecting the positions of works by sensors and delivering the necessary amount of works while many works are allowed to be standby by automatic control wherein the parallel conveyor and a shipping apparatus employed in the delivering apparatus for automatically transferring the works from a multilayer carriage to the parallel conveyor without resorting to the man power. The delivering apparatus comprises the parallel conveyor system comprises one way conveyor composed of a long conveyor and a short conveyor which follows the long conveyor, closing stoppers disposed between the long and short conveyors, an opposite way conveyor which is close to and parallel with one way conveyor, a pushing machine disposed at the side of the short conveyor for pushing and transferring the works, which are transferred from the long conveyor to the short conveyor, to the opposite way conveyor when the short conveyor stops and the closing stoppers close. The shipping apparatus comprises a passage through which a multilayer carriage passes being formed between the one way conveyor and pushing machine, a vertical hole in which the multilayer carriage drop being formed on the passage, a platform on which the multilayer carriage gets being vertically movable in the hole wherein the pushing machine pushes the works successively on each shelf of the multilayer carriage toward the one way conveyor when the platform stops at the position corresponding to the height of each row of shelves and the one way conveyor stops and the platform returns to the original position so that the next multilayer carriage can get on the platform.

7 Claims, 4 Drawing Sheets

DELIVERING APPARATUS USING PARALLEL CONVEYOR SYSTEM AND SHIPPING APPARATUS EMPLOYED BY THE DELIVERING APPARATUS

BACKGROUND OF THE INVENTION

1. Field of the Invention

The present invention relates to an apparatus for delivering works from a warehouse (hereinafter referred to as a delivering apparatus) using a parallel conveyor system which is effective for shipping works, i.e. goods such as trays for accommodating eggs from the warehouse or for supplying parts or components from one step to another step, etc. and an apparatus for shipping the works (hereinafter referred to as a shipping apparatus) from a carriage having vertical multilayer shelves (hereinafter referred to as a multilayer carriage) employed by the delivering apparatus to the parallel conveyor system.

2. Prior Art

When goods, i.e. works such as eggs are delivered from a warehouse, packed bodies of tile goods (trays where many goods are arranged lengthwise and breadthwise are laid on top of another) are carried on conveyors having belt conveyors, etc. and are arranged alternately and in parallel with one another and the amount of the works to be supplied to the exit of the warehouse is adjusted on the conveyor so as to prevent the amount of the works to be shipped by trucks, etc. from being greater or less than the average amount. Whereupon, when the works are delivered into the warehouse, a multilayer carriage having vertical multilayer shelves is used so that the works are transferred from the multilayer carriage to the conveyor.

However, according to such a prior art delivering apparatus using the parallel conveyor system, the operation speed of the conveyor is controlled and many of the works remain on movable standby in a narrow place so as to adjust the amount of supply of the works at the exit of the warehouse. However, the transfer of the works from a one way conveyor to an opposite way conveyor which travels in the direction opposite to the one way conveyor requires a lot of man power, which does not contribute to reduction of labor. Furthermore, if the works have complicated shapes such as the trays for eggs, the works are caught by other works, which makes it difficult to transfer the works.

Although the shipping of the works from the multilayer carriage to the conveyor also requires man power, in view of the fact that the multilayer carriage is movable and unstable and the works must be shipped at a higher position, which leads to hard labor and inefficient operability.

SUMMARY OF THE INVENTION

In view of the drawbacks of the prior art, it is an object of the invention to provide a delivering apparatus using a parallel conveyor system and a shipping apparatus employed by the delivering apparatus capable of automatically controlling the transfer and shipment of works without resorting to man power.

To achieve the above object, the delivering apparatus of the invention comprises a parallel conveyor system for detecting the positions of works by sensors and delivering the necessary amount of works while many works remain on standby by automatic control wherein the parallel conveyor comprises a one way conveyor composed of a long conveyor to which many works are supplied for standby and a short conveyor which follows the long conveyor, a pair of closing stoppers disposed between the long and short conveyors which close so as to permit the works to be on standby on the long conveyor and open for transferring the works from the long conveyor to the short conveyor as needed when the long conveyor stops, an opposite way conveyor which is close to and parallel with the one way conveyor, a pushing machine disposed at the side of the short conveyor opposite to the opposite way conveyor for transferring the works, which are transferred from the long conveyor to the short conveyor, to the opposite way conveyor when the short conveyor stops and the closing stoppers close.

A shipping apparatus employed in the delivering apparatus of the invention automatically transfers the works from a multilayer carriage having many shelves which are arranged vertically to the one way conveyor and comprises a passage through which the multilayer carriage passes being formed between the one way conveyor and a pushing machine, a vertical hole in which the multilayer carriage may drop being formed on the passage, a platform on which the multilayer carriage gets on being vertically movable in the hole wherein the pushing machine pushes the works successively on each shelf of the multilayer carriage toward the one way conveyor when the platform stops at the position corresponding to the height of each row of shelves and the one way conveyor stops and the platform returns to the original position so that the next multilayer carriage can get on the platform.

DESCRIPTION OF THE PREFERRED EMBODIMENT

A delivering apparatus using a parallel conveyor system and a shipping apparatus employed by the delivering apparatus according to a preferred embodiment of the invention will be described with reference to FIGS. 1 to 6.

Figure 1:
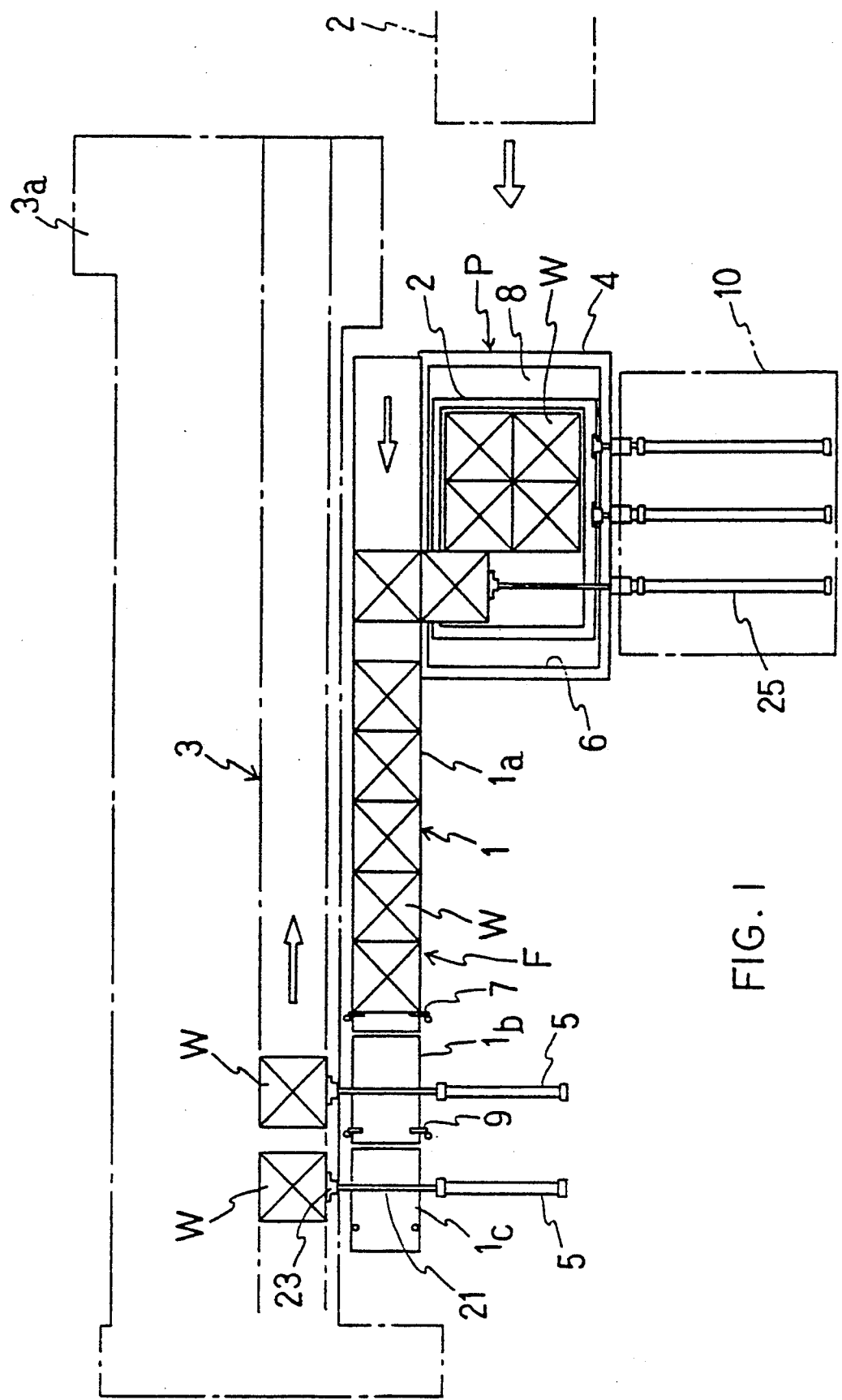
FIG. 1 is a schematic plan view showing a delivering apparatus using a parallel conveyor system and a shipping apparatus employed by the delivering apparatus.
Figure 2:
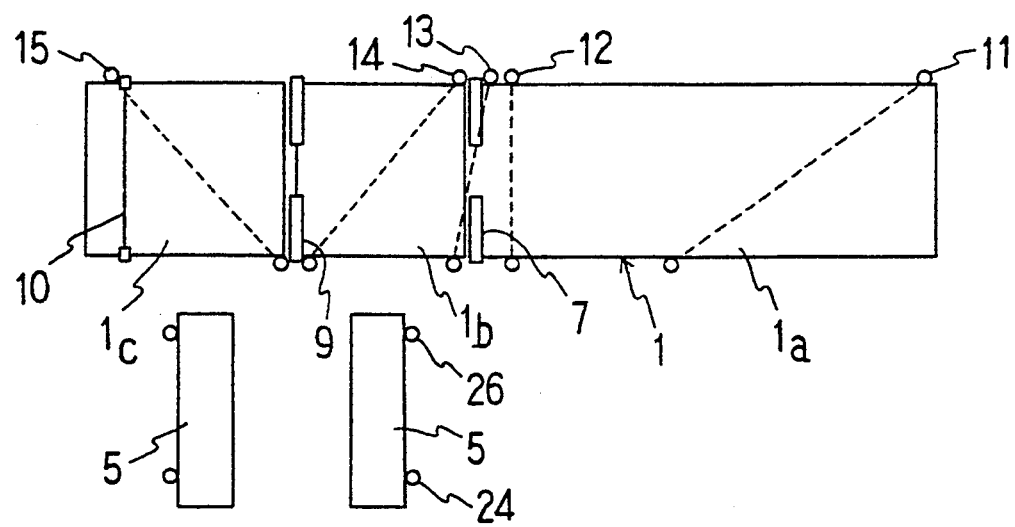
FIG. 2 is a plan view of a one way conveyor employed by the apparatus of FIG. 1.

The present invention comprises a delivering apparatus F and a shipping apparatus P for shipping a work W to an exit 3a of a warehouse. The delivering apparatus F comprises a one way conveyor 1 and an opposite way conveyor 3 which travels in the direction opposite to the one way conveyor 1 (FIGS. 1 and 2). However, the delivering apparatus F can employ the conveyors which are close to each other, wherein the work W is conveyed to the exit 3a of the warehouse while the other work W remains standby on each conveyor. The work is illustrated as a tray on which eggs are arranged in lengthwise and breadthwise and which is carried by a multilayer carriage 2. The shipping apparatus P is provided for unloading the work W from the multilayer carriage 2 to the one way conveyor 1.

A passage 4 is formed between the one way conveyor 1 and a pushing apparatus 10 and a vertical hole 6 is formed on the passage 4 so that a platform 8, on which the multilayer carriage 2 gets on, drops in the hole 6, whereby the work W is pushed toward the one way conveyor 1 by the pushing apparatus 10 while the height of multilayer carriage 2 on the elevator 8 is controlled in stages and is delivered successively by the delivering apparatus F from the exit 3a of the warehouse.

The delivering apparatus F is first described and the shipping apparatus P will be described next.

The delivery apparatus F is described hereafter.

The one way conveyor 1 is of a caterpillar type and comprises a first long conveyor 1a, short conveyors 1b and 1c which follow the long conveyor 1a in the rotating direction thereof and an opposite way conveyor 3 which travels in the direction opposite to the one way conveyor 1 and comprises a pair of endless chains 16 and 16 and a plurality of rod members 18, 18 . . . which are arranged between the endless chains 16 and 16. A pair of closing stoppers 7 and 7 are provided between the long and front short conveyors 1a and 1b and another pair of closing stoppers 9 and 9 are disposed between the front and rear short conveyors 1b and 1c and pushing machines 5 and 5 are provided at the side of the front and rear short conveyors 1b and 1c wherein the works W are pushed by the pushing machines 5 and 5 and are transferred to the opposite way conveyor 3 through slip plates 17 and 17 which are disposed between the one way and opposite way conveyors 1 and 3. The positions of the works W are detected by first to fifth sensors 11 to 15 whereby the conveyance of the work W is automatically controlled. Photocells are used as the sensors 11 to 15. Suppose that the state where the work W does not shade the light emitted by the sensors is ON (of the work) and the state where the work W shades the light is OFF (presence of the work).

Figure 3:
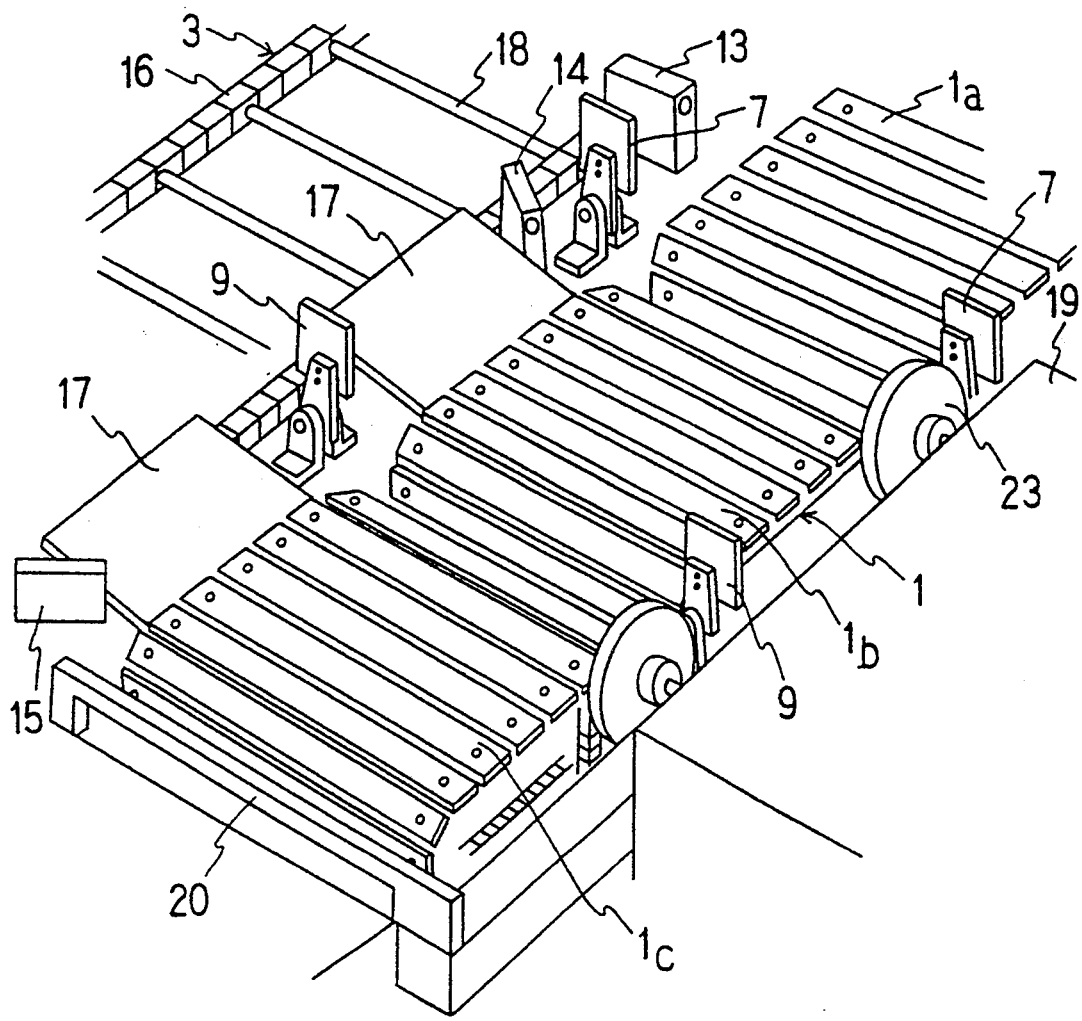
FIG. 3 is a perspective view showing a main portion of the delivering apparatus using the parallel conveyer system.

The sensors 11 to 15 are paired sensor parts arranged on both sides of the one way conveyor 1 as illustrated in FIG. 2. That is, the parts of the first sensor 11 are disposed at the front end portion and the middle portion of the long conveyor 1a so as to emit light aslant, the second sensor parts 12 are disposed at the rear ends of the long conveyor 1a so as to emit light laterally, the third sensor parts 13 are disposed at the first closing stoppers 7 so as to emit light slightly aslant, the fourth sensor parts 14 are disposed at the front and rear ends of the front short conveyor 1b so as to emit light aslant and the fifth sensor parts 15 are disposed at the front and rear ends of the rear short conveyor 14 so as to emit light aslant. The first and second closing stoppers 7 and 9 are respectively paired and disposed on both sides of the one way conveyor 1 so as to be closable. Suppose that the first and second closing stoppers 7 and 9 are OPEN when they rise as illustrated in FIG. 3 and they are CLOSED when they fall down as illustrated in FIG. 2. A fixed stopper 20 is provided at the portion close to the end of the rear short conveyor 1c.

The pushing machines 5 and 5 are of a pneumatic or hydraulic type. A case 19 for containing the pushing machines 5 and 5 is disposed at one side of the one way conveyor opposite to the opposite way conveyor 3 and comprises cylinders (not shown) having rods 21 and 21 and pushers 23 and 23 provided at the tip ends of the rods 21 and 21. In FIG. 2, sensors 24 and 26 are provided at the side of the case 19 for controlling the cylinders and the rods 21 and 21 are pulled in the cylinders after the work W is pushed thereby. Cylinders are also employed by the shipping apparatus P.

When the work W is supplied from the shipping apparatus P to the long conveyor 1a, the first sensors 11 detect it. At this time, when the work W is not present on the rear end of the long conveyor 1a (when the first sensors 11 are OFF while the second sensors 12 are OFF), the long conveyor 1a rotates at high speed to permit the work W to quickly reach the rear end of the long conveyor 1a. At this state, when the work W is not present on the front short conveyor 1b, the second sensors 12 are turned OFF so as to smoothly open the first closing stoppers 7 and at the same time the long conveyor 1a is reduced in its speed of rotation and stopped until two seconds lapse after the first closing stoppers 7 open.

When the work W is caught by the first closing stoppers 7, the long conveyor 1a rotates at low speed to thereby convey the work W at low speed so as to prevent the work W from being damaged. In any case, when the work W is present on the front short conveyor 1b, the work W on the long conveyor 1a is stopped by the first closing stoppers 7 while the long conveyor 1a rotates at low speed so that other works follow the work W whereby the works are stocked on the long conveyor 1a.

When the work W is not present on the front short conveyor 1b while another work W reaches the rear end of the long conveyor 1a, the second sensors 12 detect it whereby the first closing stoppers 7 open (until then the first closing stoppers 7 remain temporary stopped). The first closing stoppers 7 close at the same time when the work W is transferred to the first short conveyor 1b after passing through the third sensors 13 when the front short conveyor 1b rotates faster than the long conveyor 1a while the long conveyor 1a rotates at low speed.

That is, the front short conveyor 1b rotates while the long conveyor 1a rotates at low speed provided that firstly the first closing stoppers 7 are OPEN, secondly the second sensors 12 are OFF and thirdly the fourth sensors 14 are ON. The work W is transferred to the front short conveyor 1b while it is separated from the other works W which follow the work owing to the difference of speed of rotation of the long conveyor 1a and the front short conveyor 1b and the first closing stoppers 7 are stopped while the work W is transferred to the front short conveyor 1b. At this time, when the work W is present on the rear short conveyor 1c, the pushing machines 5 and 5 operate after the first closing stoppers 7 close.

When the work W is not present on the rear short conveyor 1c and the fourth sensors 14 detect the work W on the front short conveyor 1b, the second closing stoppers 9 open whereby the rear short conveyor 1c rotates at the same speed as the front short conveyor 1b and the work W is transferred to the rear short conveyor 1c which is detected by the fifth sensors 15. Three minutes after the detection of the transfer of the work W by the fifth sensors 15, the rear short conveyor 1c reduces its rotation and thereafter stops and the second closing stoppers 9 close.

Successively, the first closing stoppers 7 open and at the same time the long conveyor 1a and the front short conveyor 1b respectively rotate and the second work W is transferred to the front short conveyor 1b provided that firstly the work W is present on the rear short conveyor 1c and the fifth sensors 15 are OFF, secondly the work W is not present on the front short conveyor 1b and the fourth sensors 14 are ON, thirdly the second closing stoppers 9 are OPEN and fourthly the work is on the rear end of the long conveyor 1a and the second sensors 12 are OFF.

The third sensors 13 are ON immediately after the second work W has been transferred to the front short conveyor 1b and successively one minute later the first closing stoppers 7 close and five minutes later the front short conveyor 1b stops. At this stage since the works get on the front short conveyor 1b and rear short conveyor 1c, the opposite way conveyor 3 moves by one pitch so as to displace the works W and W which are already thereon. The pushing machines 5 and 5 operate after confirmation of the stoppage of the front short conveyor 1b so as to transfer the works W and W on the front short conveyor 1b and rear short conveyor 1c to the opposite way conveyor 3. With such a series of operations, one cycle is completed.

It is possible to transfer every two or three works W by integrating the front short conveyor 1b and rear short conveyor 1c into one short conveyor.

The shipping apparatus P is described hereafter.

A pushing machine 10 comprises a base table 27 which is slightly lower than the one way conveyor 1 in which a control box 35 having a control unit is housed and a case 29 disposed on the base table 27 in which three hydraulic cylinders 25, 25 and 25 having respectively rods are housed. Pushers 33 are attached to the tip ends of the rods of the hydraulic cylinders 25, 25 and 25. The control box 35 has start and stop buttons for operating or stopping the operation of the pushing machine 10.

A lifting apparatus 37 for raising and lowering the platform 8 and a guide frame 39 for guiding the platform 8 are respectively incorporated into the vertical hole 6. The platform 8 has guide plates 41 and 41 which stand from both sides thereof. The multilayer carriage 2 is held by the guide plates 41 and 41 and front and rear stoppers 43 and 45 so as to be positioned suitably.

Figure 6:
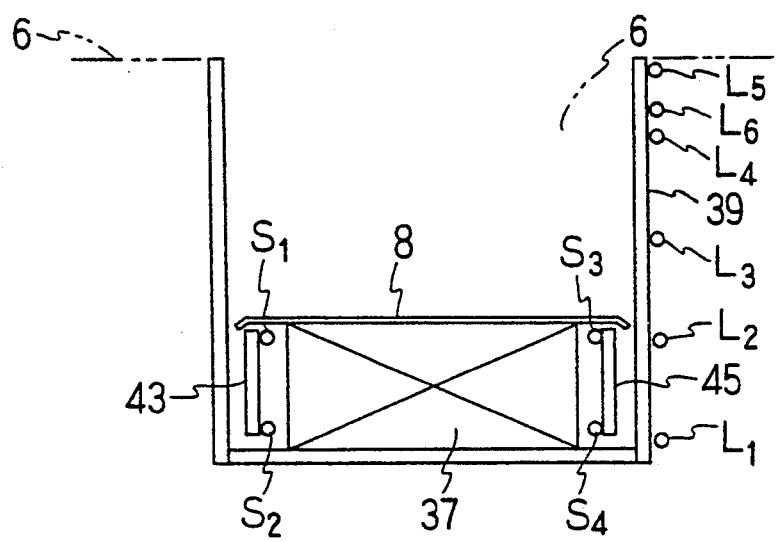
FIG. 6 is a cross-sectional view of the shipping apparatus, a part of which is cut off.

There are five limit switches L1 to L5 in the ascending order on the guide frame 39 of the platform 8 at the same interval as the height of each shelf 2a of the multilayer carriage 2 as illustrated in FIG. 6. A limit switch L6 is disposed between the limit switches L4 and L5 for detecting the height of the platform 8 when the surface of the platform 8 is flush with the passage 4. Since when the limit switch L6 detects the flush position of the platform 8 with the passage 4 (i.e. the limit switch L6 is ON), the front stopper 43 protrudes before the multilayer carriage 2 enters the passage 4, the multilayer carriage 2 moves on the platform 8 until it strikes against the front stopper 43 whereby the multilayer carriage 2 can get on the platform 8 correctly.

First optical sensors K1 are disposed at the front end portion of the passage 4 for detecting the correct, positioning of the multilayer carriage 2 on the platform 8, namely detecting that the multilayer carriage 2 correctly gets on the platform 8. The rear stopper 45 protrudes when the first optical sensors K1 detect the correct positioning of the multilayer carriage 2 on the platform 8. As a result, the multilayer carriage 2 fixedly gets on the platform 8 by the front and rear stoppers 43 and 45.

Successively, when the automatic operating start button is pressed, the pushing machine 10 operates automatically whereby the platform 8 lowers until the limit switch L1 detects the platform 8. When the platform 8 lowers to the lowest position, the uppermost shelf 2a of the multilayer carriage 2 is flush with the height of the one way conveyor 1, more in detail, the former is slightly higher than the height of the latter.

Figure 5:
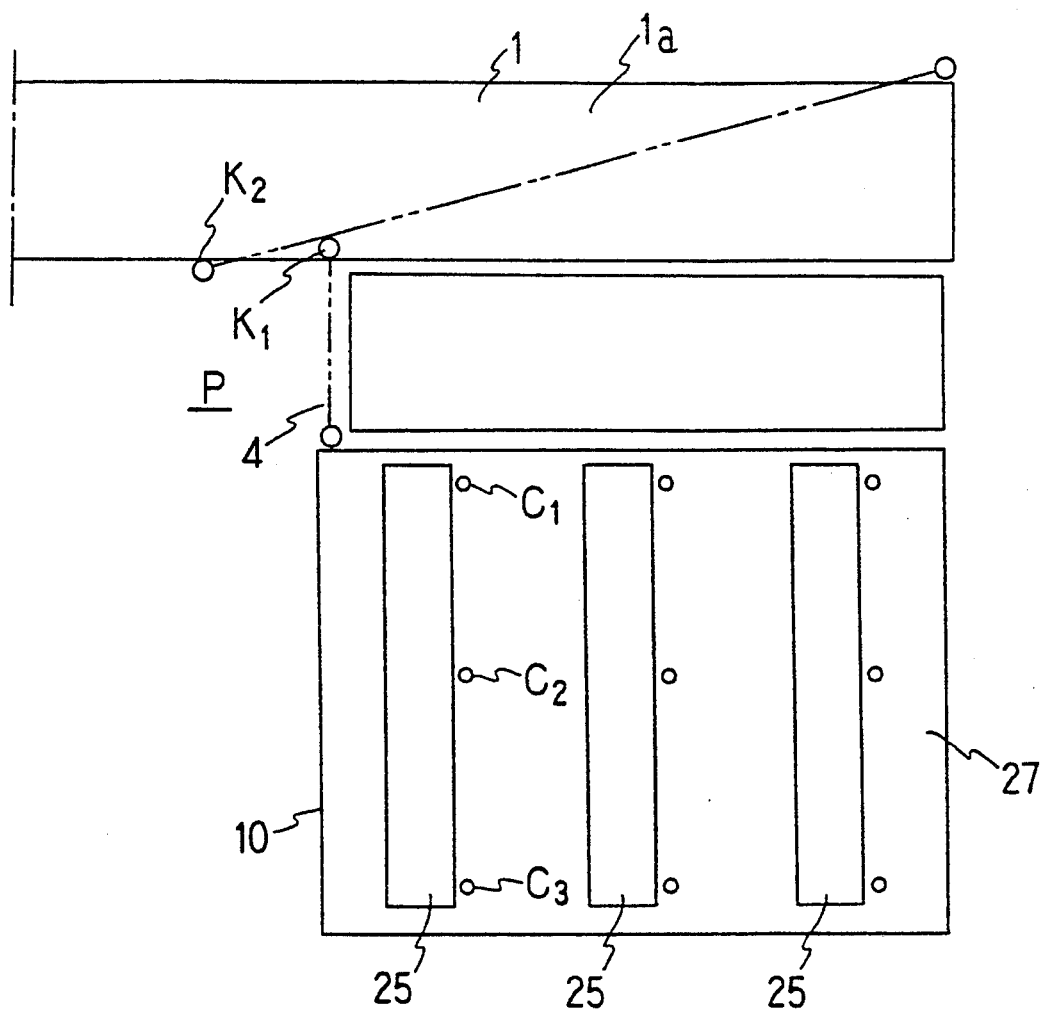
FIG. 5 is a schematic plan view showing the shipping apparatus.

Three limit switches C1, C2 and C3 are provided on the base table 27 for every hydraulic cylinder 25 as illustrated in FIG. 5. The rods of the hydraulic cylinders 25 are pushed in two stages when the limit switches C1, C2 and C3 detect the works W. Second optical sensors K2 are disposed aslant on both sides of the one way conveyor I so as to emit the light aslant.

Figure 4:
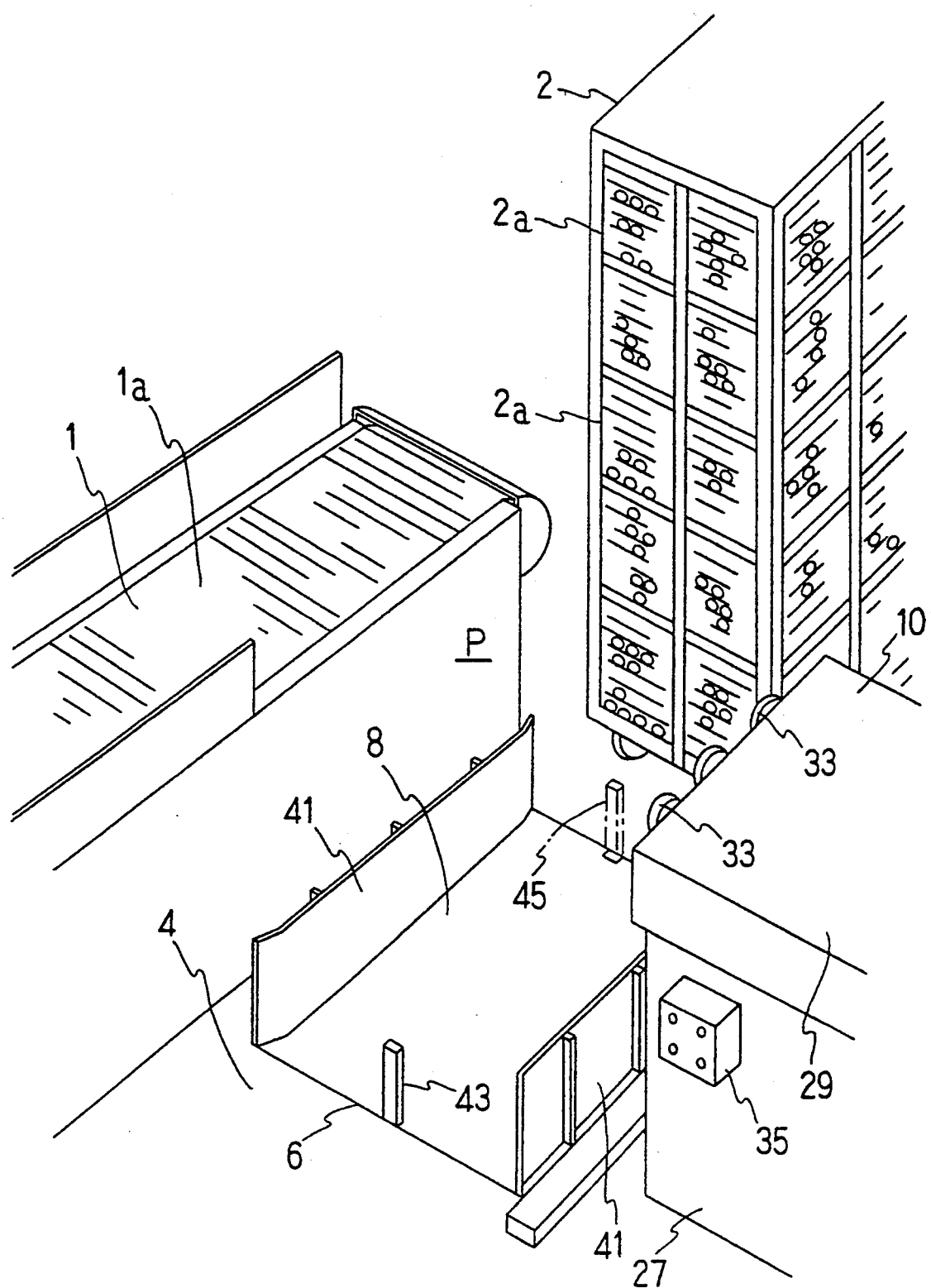
FIG. 4 is a perspective view showing a main portion of the shipping apparatus.

When the hydraulic cylinders are positioned at the first stage thereof and the work W is not present on the one way conveyor 1, the front short conveyor 1a stops due to the detection by the limit switch and the optical sensors (the third limit switch C3 is ON while the second optical sensors K2 are ON) and the hydraulic cylinders 25, 25 and 25 start to push the rods thereof at first pushing stages whereby the work W on the uppermost shelf 2a of the multilayer carriage 2 is pushed on the one way conveyor i as illustrated in FIG. 4. When the work W is transferred to the one way conveyor 1 and it is not detected by the second optical sensors K2 (K2 are ON), the one way conveyor 1 stops again so that the hydraulic cylinders 25, 25 and 25 start to push the rods thereof at second pushing stages until the second limit switch C2 is energized, whereby the work W on the second column of the uppermost shelf 2a is pushed on the one way conveyor 1. When the second optical sensors detect the pushing of the work W on the one way conveyor 1, the hydraulic cylinders 25, 25 and 25 return the rods thereof to the first pushing stages until the third limit switch C3 is energized, the long conveyor 1a rotates at high speed by the detection thereof to thereby convey the work W.

When the platform 8 rises by first stage, the work W on the second shelf 2a next to the uppermost shelf 2a is transferred to the long conveyor 1a and successively the work W on the third shelf 2a next to the second shelf 2a is transferred to the long conveyor 1a. When the work W on the lowermost shelf 2a is transferred to the long conveyor 1a, namely, when the lowermost shelf 2a is substantially flush with the long conveyor 1a, the platform 8 is positioned higher than the height of the passage 4.

When all the works W are transferred from the multilayer carriage 2 to the one way conveyor 1, the platform 8 lowers until the sixth limit switch L6 is energized. When the platform 8 is flush with the passage 4, the front and rear stoppers 43 and 45 are released from the protrusion thereof so that the empty multilayer carriage 2 is advanced forward and the next multilayer carriage 2 loaded with the works W enters the passage 4. The operation will be repeated from the beginning.

With the arrangement of the delivering apparatus as set forth above, the work can be smoothly transferred from the one way conveyor to the opposite way conveyor by the automatic control, which leads to labor saving. Furthermore, since the work to be transferred to the one way conveyor is separated from other works which follow the same work by the closing stoppers, the same work can be pushed on the opposite way conveyor without being caught by the other works. Still furthermore, since the closing stoppers open when the long conveyor remains stopped, the work can be pushed smoothly on the opposite way conveyor even if many works remain standby on the long conveyor, which leads to an excellent effect for stocking many works on the one way conveyor.

With the arrangement of the shipping apparatus as set forth above, since the works can be automatically transferred from the multilayer carriage to the one way conveyor while the multilayer carriages successively enter the passage, which leads to an excellent operability. Furthermore, the height of the multilayer carriage is adjusted when it drops in the vertical hole, many shelves can be provided on the multilayer carriage so as to effectively use the space of the warehouse.

What is claimed is:

1. A delivering apparatus comprising a parallel conveyor system for detecting the positions of works and delivering the necessary amount of works while many works remain standby by automatic control;
   said parallel conveyor system comprising:
   a one way conveyor composed of a long conveyor to which many works are supplied so as to be standby and a short conveyor which follows the long conveyor;
   a pair of closing stoppers disposed between the long and short conveyors which close so as to permit the works to be on standby on the long conveyor and open for transferring the works from the long conveyor to the short conveyor at need, at which time the long conveyor stops;
   an opposite way conveyor which is close to and parallel with the one way conveyor;
   a pushing machine disposed at a side of the short conveyor opposite to the opposite way conveyor for transferring the works from the short conveyor, to the opposite way conveyor when the short conveyor stops and the closing stoppers close.

2. A delivering apparatus according to claim 1, wherein the short conveyor comprises front and rear conveyors, and wherein a second pair of closing stoppers are disposed between the front and rear conveyors.

3. A delivering apparatus according to claim 2 further comprising sensors which are paired and disposed at both sides of the one way conveyor for detecting the presence of the works on the one way conveyor so as to adjust the amount of supply of the works and comprises a first sensor having sensor parts disposed at a front end portion and a middle portion of the long conveyor, a second sensor disposed at a rear end of the long conveyor, a third sensor disposed at the first closing stopper, a fourth sensor having sensor parts disposed at front and rear ends of the front short conveyor, and a fifth sensor having sensor parts disposed at front and rear ends of the rear short conveyor.

4. A delivering apparatus according to claim 3, wherein the sensors are photocells.

5. An apparatus according to claim 1 further comprising a shipping apparatus for automatically transferring the works from a multilayer carriage having many shelves which are arranged vertically to the one way conveyor and comprises:
   a passage through which the multilayer carriage passes being formed between the one way conveyor and the pushing machine;
   a vertical hole, in which the multilayer carriage may rise or drop being formed on the passage;
   a platform on which the multilayer carriage gets on being vertically movable in the hole; and
   a second pushing machine for pushing the works successively on each shelf of the multilayer carriage toward the one way conveyor when the platform stops at a position corresponding to a height of each row of shelves, and the one way conveyor stops and the platform returns to an original position so that a next multilayer carriage can get on the platform.

6. An apparatus according to claim 5, wherein the pushing machine comprises a base table in which a control box having a control unit is housed, a case disposed on the base table in which three hydraulic cylinders having respective rods are housed and pushers attached to tip ends of the rods of the hydraulic cylinders.

7. An apparatus according to claim 5, wherein a lifting apparatus for raising and lowering the platform and a guide frame for guiding the platform are respectively incorporated into the vertical hole.

* * * * *